(12) United States Patent
Eum

(10) Patent No.: US 8,123,870 B2
(45) Date of Patent: Feb. 28, 2012

(54) HANDHELD STERILIZATION DEVICE

(75) Inventor: Se Hyung Eum, Seoul (KR)

(73) Assignee: Dyne Electronics Inc., Northvale, NJ (US)

( * ) Notice: Subject to any disclaimer, the term of this patent is extended or adjusted under 35 U.S.C. 154(b) by 0 days.

(21) Appl. No.: 13/236,790

(22) Filed: Sep. 20, 2011

(65) Prior Publication Data

US 2012/0027644 A1 Feb. 2, 2012

Related U.S. Application Data

(62) Division of application No. 12/845,890, filed on Jul. 29, 2010, now Pat. No. 8,048,231.

(51) Int. Cl.
*B08B 7/04* (2006.01)
*B08B 7/02* (2006.01)

(52) U.S. Cl. ......... 134/58 R; 134/1; 134/25.3; 134/113; 15/3.1; 210/748.01; 210/748.1; 210/748.11; 210/748.19

(58) Field of Classification Search .................. None
See application file for complete search history.

(56) References Cited

U.S. PATENT DOCUMENTS 5,720,905 A * 2/1998 Ho .................................. 261/16

* cited by examiner

*Primary Examiner* — Michael Barr
*Assistant Examiner* — Caitlin N Dennis
(74) *Attorney, Agent, or Firm* — Michael J. Feigin, Esq.

(57) ABSTRACT

Embodiments of the disclosed technology comprise a handheld cleaning device that sanitizes an item to be cleaned by, in a single action, dispensing ozone and ultrasonic wave cavitations in an aqueous medium that contains the object to be cleaned. The handheld device comprises a dipping end, which further comprises an ozone generator, dispensing ozone from the dipping end, and an ultrasonic wave generator generating ultrasonic cavitation in an aqueous medium. The device is configured to be held on a holding end, with a side opposite the holding end configured for dipping into an aqueous medium (e.g., water, cleaning fluid, liquids, etc.) which is contained in a vessel. The vessel is a concave structure capable of holding such aqueous medium, such as a sink, a bowl, a basin, and the like.

11 Claims, 6 Drawing Sheets

HANDHELD STERILIZATION DEVICE

This Application is a divisional of and claims priority to U.S. patent application Ser. No. 12/845/890, entitled "Handheld sterilization device" filed on Jul. 29, 2010

FIELD OF THE DISCLOSED TECHNOLOGY

The disclosed technology relates generally to a handheld device for sanitation by means of ozone production and ultrasonic cavitation.

BACKGROUND OF THE DISCLOSED TECHNOLOGY

Microorganisms on food products as well as other common products are a large cause for the spread of certain illnesses. Due to bacteria and pesticides that are often present on fruits and vegetables, it is not uncommon for the person who handles and/or ingests the food to become seriously ill. According to the CDCP, in the years 1996-1997 alone, there were 76 million cases of food-borne illnesses in the United States alone. Sickness results from such food-borne bacteria as *salmonella, listeria, campylobacter, Escherichia coli* 0157:H7, *shigella*, etc. These bacteria used to only appear on meats, but due to new fertilization techniques, they have begun to appear on other foods such as spinach and peanut butter. Also, other germs, such as strains of the flu, can be passed on to food by any person who handles that food.

Fear and worry about certain bacteria in fruits and vegetables can have an economic impact on the food industry. For instance, researchers working with Western growers estimated that the 2006 North American *E. coli* outbreak cost spinach farmers in the United States $74 million.

Harmful microorganisms do not just appear on food products, but also on many objects that come into contact with food, such as eating utensils and wash clothes. If these objects are not properly cleaned, the microorganisms they pick up can be transferred to food which will later be ingested. Other objects, though they rarely, if ever, touch food, such as children toys, mouth guards, oral equipment, and the like, can also carry dangerous microorganisms, Also, the bacteria and other microorganisms on perishable foods are a main source of food spoilage. If the microorganisms on food were removed, the food would stay fresh longer.

The rate of sickness and its economic impact show that the current sanitation methods, such as washing food in a sink filled with water, is not sufficient. A method must be found to properly sanitize the food of harmful microorganisms.

SUMMARY OF THE DISCLOSED TECHNOLOGY

The disclosed technology described herein addresses an unfulfilled need in the prior art by providing a method and device for sanitizing food by sterilization.

In an embodiment of the disclosed technology, an easy to use hand-held food sterilization device is provided which kills bacteria and removes residual pesticides from fruits and vegetables. Such a device uses ultrasonic waves to loosen up bacteria by cavitation while, at the same time, producing ozone to kill the microscopic organisms.

More specifically, in an embodiment of the disclosed technology, a handheld cleaning device comprises two ends—a holding end and a dipping end. The dipping end comprises an ozone generator which dispenses ozone from the dipping end, as well as an ultrasonic wave generator which generates ultrasonic cavitation pulses in an aqueous medium. Further, it provides an electrical connection between at least one power switch and both the ozone and the ultrasonic generators. The holding end is adapted for gripping and comprises at least one power switch operable to simultaneously activate and/or deactivate the ultrasonic wave generator and the ozone generator. The ozone mutates the microscopic organisms, which then prevents the reproduction of the microscopic organisms. The ultrasonic waves create the collapse of millions of microscopic cavitations (which are hereafter referred to simply as cavitation) which sterilizes the object and loosens up the microscopic organisms. By loosening the organisms, the ozone is able to kill them more efficiently. For purposes of this disclosure, kill is defined as ending the life of an organism or ending its ability to reproduce and create new organisms.

Further embodiments of the disclosed technology provide a power switch comprising at least two operable power settings to supply current to the ozone and the ultrasonic generators. A first power setting engages in a first electrical pathway, and the second electrical pathway engages in both the first and the second electrical pathways. Embodiments may further comprise a plurality of power settings corresponding to the first electrical pathway and a plurality of other pathways, where each electrical pathway is operable to provide current to the ozone and the ultrasonic generators. The different power settings result in different amounts of ozone being created per unit of time and varying amplitudes of ultrasonic waves being generated. In embodiments disclosed, activation of the device is prevented until at least part of the dipping end is submerged in the aqueous medium and/or deactivation is automatic upon removal or after a preset duration of activation.

Furthermore still, in an embodiment of the disclosed technology, the device comprises at least two lights. A first light and a second light correspond with a respectively high and low generation of oxygen and ozone.

In a further embodiment of the disclosed technology, a method of operating a generally elongated handheld cleaning device having an oppositely disposed holding region and dipping region is disclosed. This method comprises placing a food item and an aqueous medium into a vessel (bowl, sink, basin, etc.), holding a first elongated portion of the handheld cleaning device at the holding end, and submerging (at least a part of a) second elongated portion in the aqueous medium. The second elongated portion is opposite the first elongated portion and the handheld cleaning device, and forms a unitary structure which may be powered directly or by an internal source, such as a battery. The method further comprises, in a single action, dispensing ozone and cavitation pulses from the dipping end into the aqueous medium and then, in a second single action, ceasing dispensing of the ozone and cavitation pulses, then removing the portion of the dipping end from the aqueous medium. The second single action may be caused by removal of the portion of the dipping end or after a predetermined duration of time after the first single action. Furthermore, after the first action and/or before the second action, a second food item is placed in the aqueous medium.

In further embodiments of the disclosed technology, power settings may be selected to determine the power levels. An intensity of light emanating from the device may correspond to the power level.

In accordance with these and other objects which will become apparent hereinafter, the disclosed technology will now be described with particular reference to the drawings.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed technology comprise a handheld cleaning device that sterilizes objects by simultaneously dispensing ozone and ultrasonic cavitation in order to kill microscopic organisms (e.g., bacteria, fungi, Achaea, protists, etc.) that are on an object to be cleaned. The handheld device comprises a dipping end, which further comprises an ozone generator, dispensing ozone from the dipping end, and an ultrasonic wave generator generating ultrasonic cavitation in an aqueous medium. The device is configured to be held on a holding end, with a side opposite the holding end configured for dipping into an aqueous medium (e.g., water, cleaning fluid, liquids, etc.) which is contained in a vessel. The vessel is a concave structure, such as a sink, a bowl, a basin, and the like, capable of holding such aqueous medium.

"Object to be cleaned" may be any object that has harmful bacteria on the surface that later might be ingested; including foods such as fruits, vegetables, meats, grains, beans, legumes and the like, and non-food items such as cooking utensils, oral equipment, scuba gear, children toys, cleaning products, washcloths, and the like. Once an object is submerged (partially or fully) inside the aqueous medium, the dispensing end of the handheld cleaning device (the end opposite the holding end) is placed inside the medium. The handheld device is then activated by at least one power switch, which is operable to simultaneously activate the ultrasonic wave generator and the ozone generator. The ultrasonic cavitation from the ultrasonic wave generator loosens up the microorganisms on the surface of the object to be cleaned. The ozone that is produced from the handheld device kills microorganisms. By loosening up the microorganisms, the ozone increases the efficacy of sterilization of the bacteria.

The power switch may be operable to simultaneously deactivate the ultrasonic wave generator and the ozone generator. Deactivation via the power switch is achieved by manual operation, removal of the dipping portion from the aqueous medium, or automatically after a predetermined duration of time of activation.

The disclosed technology will become clearer in light of the description of the figures.

Figure 1:
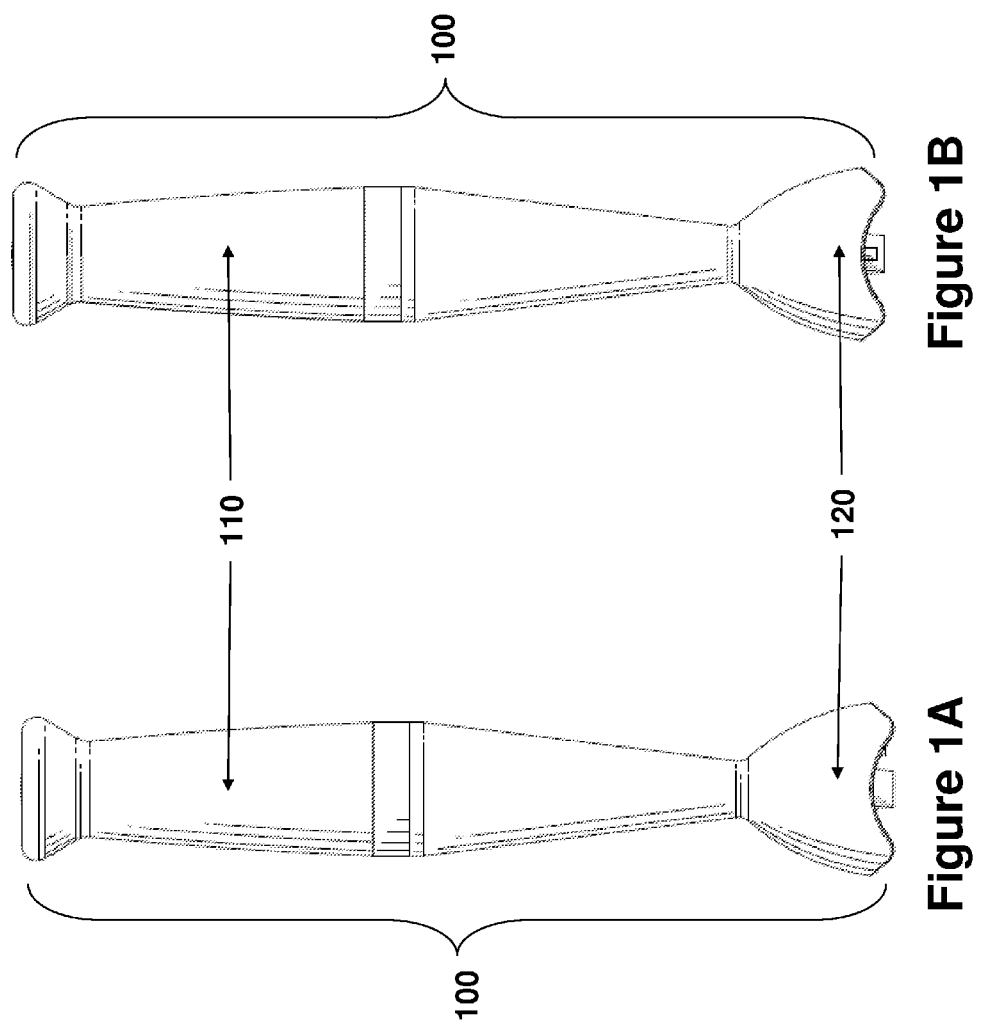
FIG. 1A shows a first side view of a handheld cleaning device in an embodiment of the disclosed technology.
FIG. 1B shows a second side view of a handheld cleaning device in an embodiment of the disclosed technology.

FIG. 1A and FIG. 1B show a first and second side view of a handheld cleaning device in an embodiment of the disclosed technology. The handheld cleaning device 100 comprises a holding end 110 and a dipping end 120. The holding end 110 is adapted for gripping by a hand or hands of a single user, where a user who is holding the device may move the device freely without external assistance. The dipping end 120 is adapted for submergence into a vessel containing an aqueous medium which further comprises an item to be cleaned. The holding end 110 and dipping end 120 form a unitary structure (such as a unitary mold or multiple pieces held together as one contiguous unit) of the elongated device. The holding end is opposite the dipping end—that is, at opposite sides of the elongated plain of the device. The handheld cleaning device is adapted for a person to be able to take it by the handheld portion and place the dipping end into the aqueous medium. In an embodiment disclosed, the handheld cleaning device 100 contains an indicium or distinguishable mark indicating the termination of the dipping end 120.

Figure 2:
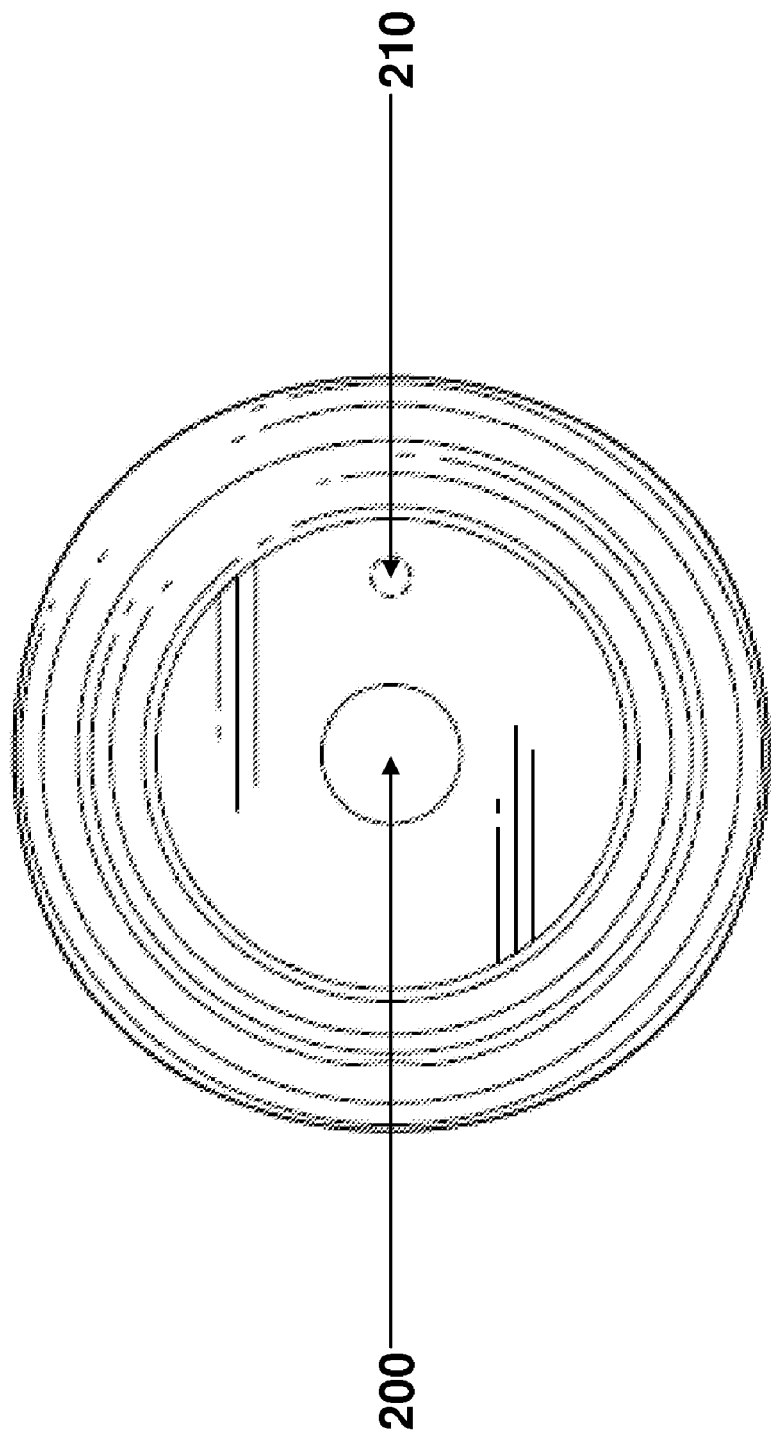
FIG. 2 shows a top side view of a handheld cleaning device in an embodiment of the disclosed technology.

FIG. 2 shows a top side view of a handheld cleaning device in an embodiment of the disclosed technology. In the embodiment disclosed, the holding end 110 is adapted for gripping and comprises at least one power switch 200. The power switch 200 is operable to simultaneously activate the ultrasonic wave generator and the ozone generator (discussed in further detail below) via an electronic connection. In the example displayed in FIG. 2, the power switch 200 is a push button operable by an application of momentary pressure. In embodiments disclosed, the power switch is any trigger that allows a manual changing of settings, such as a radio button, a discrete position switch, an analog dial, and the like. In further embodiments, the power switch 200 is operable to simultaneously deactivate the ultrasonic wave generator and the ozone generator.

In still further embodiments, the power switch comprises at least two power settings. A first power setting engages one of the at least two power settings which engages in a first electrical pathway operable to provide an electrical current to the ozone and the ultrasonic generator. A second power setting of the at least two power settings engages the device in a first electrical pathway as well as a simultaneous second electrical pathway to provide a greater amount of current to the ozone and the ultrasonic generator, so that these respective generators produce a greater amount of ozone and a larger amplitude of ultrasonic waves. In further embodiments, there are additional power settings to correspond to engaging the first electrical pathway and a plurality of other electrical pathways, where each pathway is operable to provide current to the ozone and the ultrasonic generators. The different combinations of the plurality of pathways provide different power settings for each combination of pathways. In an embodiment of the disclosed technology, the amount of power supplied is proportionate to the amount of power of the ozone generator and the ultrasonic wave generator combined.

In an embodiment disclosed, a first light source 210 is configured to correlate to the low generation of oxygen and of ozone. A second light 210 source is configured to correlate a high level of ozone and oxygen. Likewise, such lights may emanate from the dipping end of the device and correspond to the amount of power. As such, for example, at low power, a first intensity of light is shone through the aqueous medium. At a higher power, a second intensity, which is higher than the first intensity of light, is shone through the aqueous medium. This gives a user the feeling that "something is happening" as ozone is invisible and cavitation pulses may be difficult to see. Still further, instead of, or in addition to, the changing of intensity, the frequency of light pulses may change.

Different light sources are defined to be at least two light sources that can be visibly differentiated by the naked eye by being separate light sources, pulsating the light at different frequencies, having different luminosities, having different colors, or the like. In an example of an embodiment as displayed in FIG. 2 for purely illustrative purposes, the power switch 200 is a push button. When the power switch 200 is pressed once, the first power setting is activated and a green light emanates from the light source 210. The power switch 200 is pressed a second time, the second power setting is activated, and the light source 210 exhibits a different color. The light switch is activated a third time, and the light source 210 of the handheld cleaning device 100 is de-activated and the light source 210 does not exhibit any light.

Figure 3:
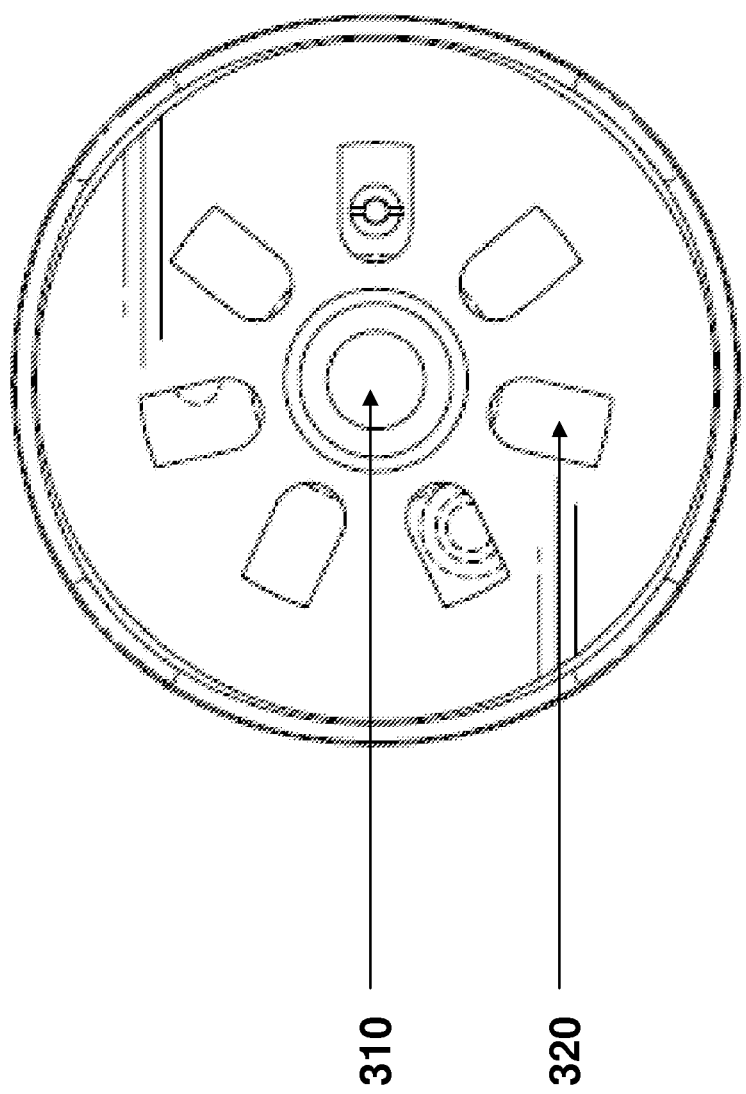
FIG. 3 shows a bottom side view of a handheld cleaning device in an embodiment of the disclosed technology.

FIG. 3 shows a bottom side view of a handheld cleaning device in an embodiment of the disclosed technology. In the figure shown, the ultrasonic waves for cavitation are produced at an ultrasonic wave generator 310. Such a wave generator is known to any person of reasonable skill in the art. Ultrasonic waves are defined as vibrations approximately within 14 kilohertz to 420 kilohertz. Objects are cleansed by ultrasonic waves because the vibrations collapse a large number of formed bubbles in quick succession (cavitations) on, near, or at an object, and the collapse of these cavitations creates cavitation bubbles which loosen up any microorganisms that are attached to the surface of the object. The ultrasonic wave generator is comprised of a vibrating device that vibrates at an ultrasonic frequency in an aqueous medium. A vibrating device that operates at an ultrasonic frequency produces waves within the aqueous medium at the same frequency. The amount of electrical power provided to the ultrasonic generator controls that amplitude of the vibrations of the vibrating device, while the frequency remains constant.

In embodiments of the disclosed technology, the ozone is created in an ozone generator 320. The ozone generator 320 is defined as a mechanism, as known to a person of ordinary skill in the relevant prior art, configured to produce ozone (chemically known as $O_3$) in the presence of dioxygen (chemically known as $O_2$) and is referred to in this patent simply as oxygen. The ozone generator 320 may comprise an ozone plate. Adding ozone to the aqueous medium kills bacteria and other microorganisms on the object for cleaning. Activation of the ultrasonic wave generator 310 and the ozone generator 320 in the aqueous medium in a single action allow the handheld cleaning device to more effectively kill bacteria than both the ultrasonic cavitation and production of ozone occurring to the aqueous medium at different times, because the production of the ultrasonic cavitation loosens up microorganisms that are on the item to be cleaned, which allows the ozone produce to kill the ozone more effectively. In further embodiments, levels of ozone produced by the handheld device are indicated by a light source 210.

Figures 4A, 4B:
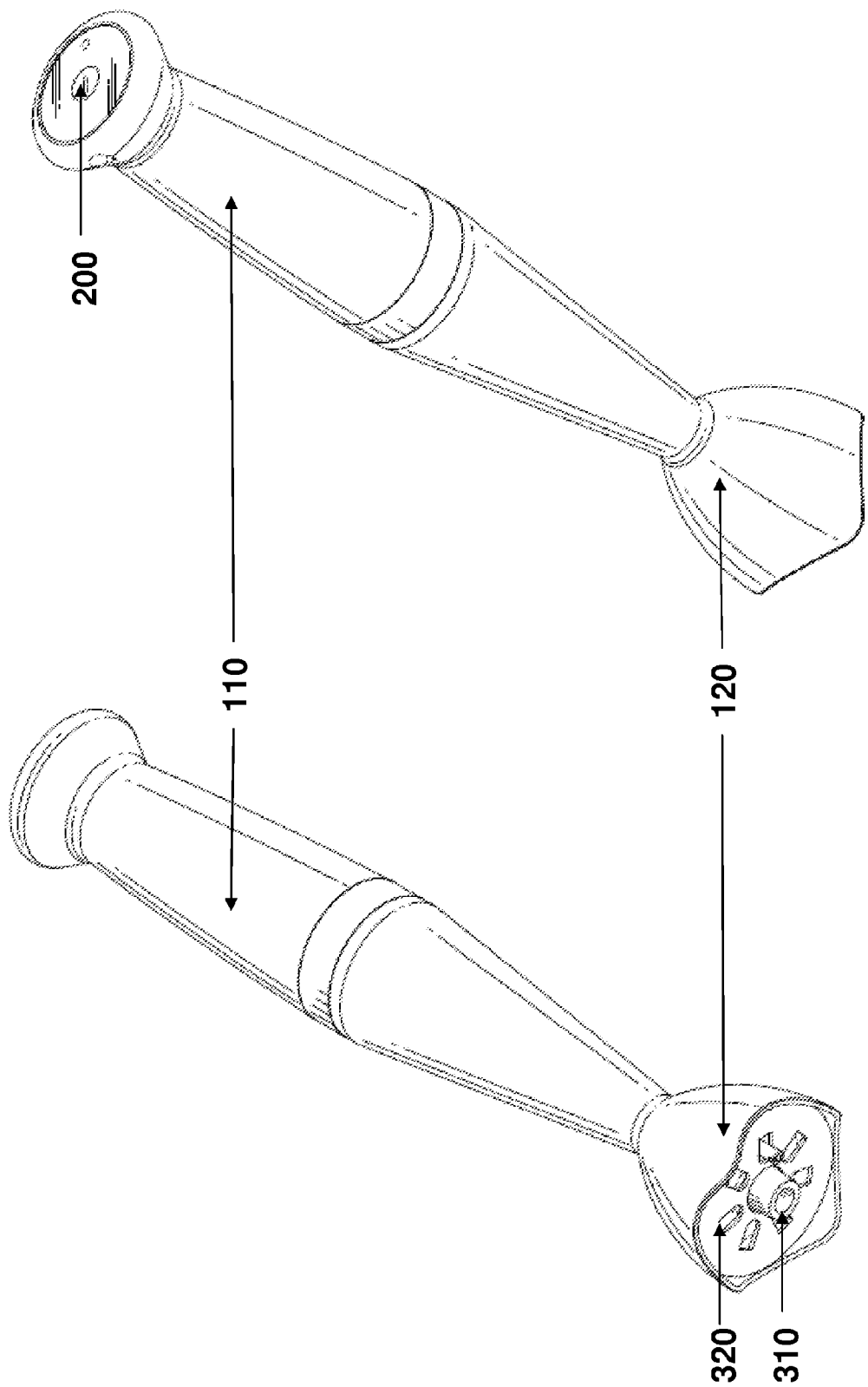
FIG. 4A shows a bottom perspective view of a handheld cleaning device in an embodiment of the disclosed technology.
FIG. 4B shows a top perspective view of a handheld cleaning device in an embodiment of the disclosed technology.

FIG. 4A and FIG. 4B show, respectively, a lower side view and an upper side view of a handheld cleaning device in an embodiment of the disclosed technology. The example of the handheld cleaning device in FIGS. 4A and 4B correlates to the example displayed in FIG. 1A and FIG. 1B. In an embodiment of the disclosed technology, the ultrasonic wave generator 310 and the ozone generator automatically deactivate upon removal of the dipping end from the aqueous medium. An embodiment of the disclosed technology may require a detector to determine when the item has been removed from the aqueous medium, to trigger the automatic deactivation.

An example of a detector is a mechanism that measures the resistance against the vibrating device, since being submerged in the aqueous medium would produce more resistance than being in the air. Another form of detection of removal of the dipping portion is a sensor that detects the presence of water by air pressure, change in conductivity in a circuit, and the like. A sensor not dependent on the vibrating device would give the benefit of deactivation of the handheld cleaning device for a determined amount of exposure of the dipping end. Since the device produces ozone gas, which is harmful when breathed in directly, an automatic deactivation prevents direct exposure to any ozone produced.

In further embodiments of the disclosed technology, the ultrasonic wave generator and the ozone generator deactivate after a predetermined duration of activation time. Deactivation after a predetermined amount of time ensures that the device is used at a safe rate and also minimizes unnecessary usage when the handheld cleaning device is unattended. A predetermined duration of time is within 1 minute, 2 minutes, 5 minutes, or 10 minutes. In an embodiment disclosed, the deactivation time is set by a person using the handheld cleaning device or by its manufacturer.

Figure 5:
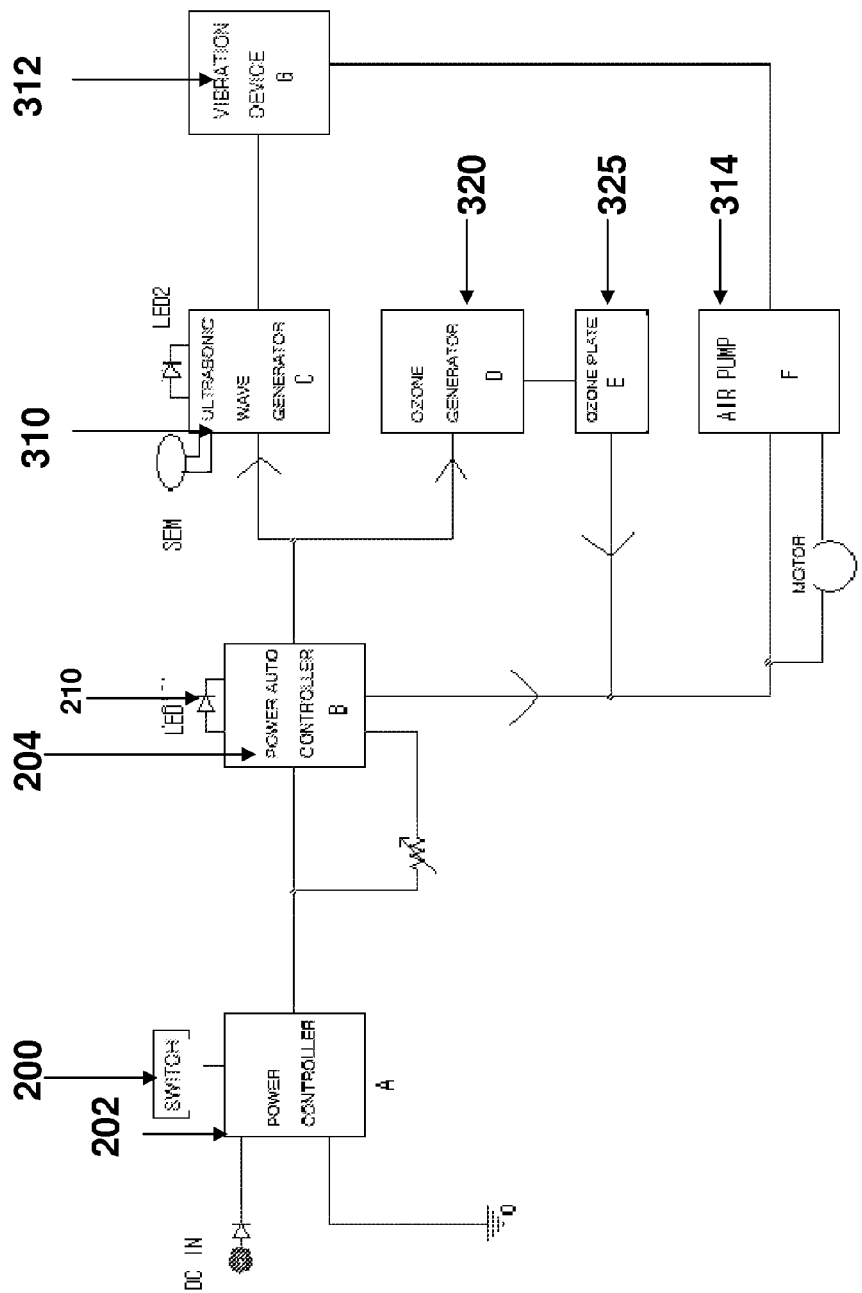
FIG. 5 shows a circuit diagram of the handheld cleaning device in an embodiment of the disclosed technology.

FIG. 5 shows a circuit diagram of the handheld cleaning device in an embodiment of the disclosed technology. The circuit diagram shown in FIG. 5 is an example of construction, for illustrative purposes. An embodiment disclosed, as exhibited in the diagram, comprises a power source which is an internal and/or an external source. The power source may provide direct or alternating current. Examples of an internal source include rechargeable batteries, reusable batteries, solar panels, and the like. Electrical power from the power source is controller 202 by a power controlled by the power switch 200. Based on the settings of the power switch 200, the current is either blocked, goes through a single electrical pathway, a first and a second electrical pathway, or several electrical pathways. Using multiple pathways allows more power to go to the ozone generator and the vibration device, which thus more effectively sterilize the object to be cleaned.

The current passing through the electrical pathway further transfers to a power auto-controlled 204 which regulates the power to further elements of the handheld cleaning device. The power auto-control may also be toggled with the automatic deactivation device, so as to break the circuit when a portion of the dipping end is removed from the aqueous medium. In the example exhibited, the power auto-controller is toggled with a scanning electron microscope, which is configured to detect the presence of water.

A light source 210 indicates how much electrical current is presently being provided, the amount of ozone and oxygen generated, the presence of a power source, etc. Electrical current is passed simultaneously to the ultrasonic wave generator and the vibration device 312, in embodiments of the disclosed technology. The ultrasonic wave generator 310 comprises a vibration device 312 and an air pump 314 in embodiments of the disclosed technology. The vibration device 312 vibrates at an ultrasonic frequency to vibrate the aqueous medium as well as pockets of air. The pockets of air, which are expelled from the dispenser by way of the air pump 314, carry some of the energy of the ultrasonic vibrations and further clean the material and loosen the microscopic organisms. Current simultaneously goes to the ozone generator 320 which comprises an ozone plate 325.

The ozone generator produces ozone from dioxygen by, for example, the corona discharge method, exposure to cold plasma, and electrical voltage. Once the ozone is produced, it is collected in the ozone plate before being dispersed into the aqueous medium. The electrical current simultaneously being provided to the ultrasonic wave generator 310 and the ozone generator 320 results in simultaneous production of both ultrasonic waves and ozone, which allows for a more efficient sterilization of the item to be cleaned because the ultrasonic cavitations lead to a loosening of the microscopic organisms that are attached to a item to be cleaned, which allows the ozone to kill the bacteria more efficiently.

Figure 6:
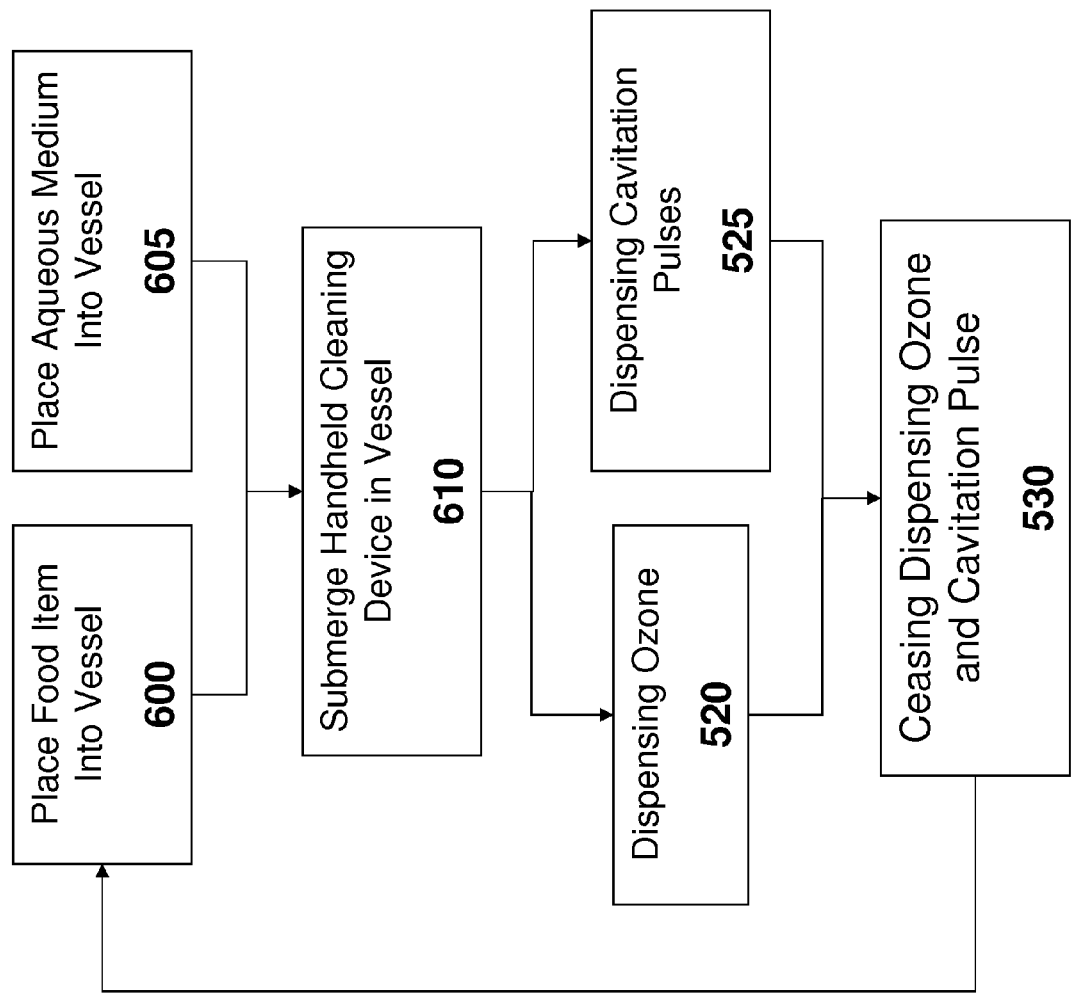
FIG. 6 shows a method of using a handheld cleaning device in an embodiment of the disclosed technology.

FIG. 6 shows a method of using a handheld cleaning device in an embodiment of the disclosed technology. An embodiment of the disclosed technology comprises a method of operating a generally elongated handheld cleaning device having an oppositely disposed holding region and a dipping region. In embodiments disclosed, the method comprises placing an aqueous medium into a vessel 605. The method further comprises placing a food item into a vessel 600. A food item, such as the item to be cleaned as mentioned above, is defined as any item that is placed in a person's mouth or comes into contact with items that may be placed in a person's mouth, such as edible foods, utensils for foods, supplies for cleaning foods, children's toys, etc. A vessel, similar to such as mentioned above, is defined as an object capable of containing an aqueous medium; e.g., a sink, bowl, tub, tank, and the like. Placement of the food into the vessel 600 occurs before, after, and/or during the placement of the aqueous medium into the vessel 605.

The method further comprises holding a first elongated portion of the handheld cleaning device at a holding end and submerging a second portion of the handheld cleaning device into the vessel. The second elongated portion of the handheld cleaning device is disposed opposite the first elongated portion and forms a unitary structure with the end that dips into the vessel. The dipping end, as mentioned above, comprises an ozone generator 320 and an ultrasonic wave generator.

The method further comprises, in a first single action, dispensing ozone 520 and ultrasonic cavitation pulses 525 from the dipping end into the aqueous medium. In a second single action, ceasing dispensing of the ozone and cavitation pulses 530 takes place, after which the portion of the dipping end is removed from the aqueous medium. In an embodiment disclosed, removal of the portion of the dipping end results in the second single action of ceasing dispensing ozone and cavitation pulses 530. In further embodiments, the second single action occurs automatically after a predetermined duration of time after the first single action. In an embodiment disclosed, the method of operating the handheld device includes that, after the first single action, a second food item is placed in the medium before the second single action or after the second single action. Therefore, multiple food items are cleaned without the need to replace the aqueous medium.

In further embodiments of the disclosed technology, a method comprises selecting a first power setting of at least two power settings of a power switch 200. A first power switch of at least two settings engages in a first electrical pathway, which is operable to provide electrical current to the ozone and the ultrasonic generators. An embodiment of the method further comprises selecting a second power setting of a plurality of power settings engaging in a second electrical pathway, which is able to provide current to the ozone and the ultrasonic generators. In an embodiment disclosed, the handheld cleaning device is battery powered, powered by an external source, or a combination thereof. In an embodiment of the disclosed technology, current oxygen and ozone levels in the ozone generator are indicated by a light source 210.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A handheld cleaning device comprising:
a generally elongated body having an oppositely disposed holding region and dipping region;
said dipping region comprising a cupped dipping end having an ozone generator and an ultrasonic generator;
said ozone generator dispensing ozone from said cupped dipping end;
said ultrasonic wave generator generating ultrasonic cavitation in an aqueous medium at said cupped dipping end;
an electrical connection between at least one power switch and said ozone and said ultrasonic wave generator;
said holding region adapted for gripping and comprising said at least one power switch, said at least one power switch operable to simultaneously activate said ultrasonic wave generator and said ozone generator.

2. The handheld device of claim 1, wherein said power switch is operable to simultaneously deactivate said ultrasonic wave generator and said ozone generator.

3. The handheld device of claim 1, wherein said simultaneous activation is prevented until at least a part of said cupped dipping end is submerged in said aqueous medium.

4. The handheld device of claim 1, wherein said ozone generator comprises an ozone plate.

5. The handheld device of claim 1, wherein said cupped dipping end comprises said ozone generator and said ultrasonic wave generator disposed within a concave portion of said cupped dipping end.

6. The handheld device of claim 1, wherein said power switch comprises at least two power settings, a first power setting of said at least two power settings engaging a first electrical pathway, and a second power setting of said at least two power settings engaging said first electrical pathway and, in addition, a second electrical pathway, and said first and second electrical pathways are operable to provide current to said ozone and said ultrasonic generator.

7. The handheld device of claim 6, wherein further power settings correspond to engaging said first electrical pathway and a plurality of other electrical pathways, said electrical pathways each operable to provide current to said ozone and said ultrasonic generator.

8. The handheld device of claim 7, wherein a first light is configured to correlate with a low generation of oxygen and said ozone.

9. The handheld device of claim 1, wherein said ultrasonic wave generator and said ozone generator automatically deactivate upon removal of said cupped dipping end from said aqueous medium.

10. The handheld device of claim 9, wherein said ultrasonic wave generator and said ozone generator deactivate after a predetermined duration of activation.

11. The handheld device of claim 10, wherein a second light is configured to correlate with a high generation of oxygen and said ozone.

* * * * *